(12) United States Patent
Enquist et al.

(10) Patent No.: US 12,377,367 B2
(45) Date of Patent: Aug. 5, 2025

(54) SOLVENT EXTRACTION SYSTEM AND METHOD

(71) Applicant: SKF RECONDOIL AB, Ostersund (SE)

(72) Inventors: Karl Enquist, Bromma (SE); Thomas Persson, Sandviken (SE); Tomas Östberg, Fröson (SE)

(73) Assignee: SKF RECONDOIL AB, Ostersund (SE)

( * ) Notice: Subject to any disclaimer, the term of this patent is extended or adjusted under 35 U.S.C. 154(b) by 345 days.

(21) Appl. No.: 17/916,096

(22) PCT Filed: May 12, 2021

(86) PCT No.: PCT/EP2021/062674
§ 371 (c)(1),
(2) Date: Sep. 30, 2022

(87) PCT Pub. No.: WO2021/233759
PCT Pub. Date: Nov. 25, 2021

(65) Prior Publication Data
US 2023/0143845 A1    May 11, 2023

(30) Foreign Application Priority Data
May 18, 2020   (DE) .......................... 102020206227.7

(51) Int. Cl.
*B01D 11/04*   (2006.01)
*B01D 17/04*   (2006.01)
*C10M 175/00*  (2006.01)

(52) U.S. Cl.
CPC ...... *B01D 11/0492* (2013.01); *B01D 11/0415* (2013.01); *B01D 11/0457* (2013.01);
(Continued)

(58) Field of Classification Search
CPC ............ B01D 11/0415; B01D 17/047; C10M 175/005
See application file for complete search history.

(56) References Cited

U.S. PATENT DOCUMENTS

| | | |
|---|---|---|
| 1,951,739 A | 3/1934 | Rodman et al. |
| 2,023,988 A | 12/1935 | Bissell et al. |
| (Continued) | | |

FOREIGN PATENT DOCUMENTS

| | | |
|---|---|---|
| CA | 2747909 C | 6/2014 |
| CN | 85100831 A | 7/1986 |
| (Continued) | | |

OTHER PUBLICATIONS

Third Party Observation mailed Dec. 9, 2024, in related EP application No. 21730870, and pending claims 1-15.
(Continued)

*Primary Examiner* — Bradley R Spies
(74) *Attorney, Agent, or Firm* — J-TEK LAW PLLC; Jeffrey D. Tekanic; Scott T. Wakeman

(57) ABSTRACT

A solvent extraction system includes an elongated solvent extraction chamber having first and second ends, at least one first port for providing a continuous phase into the solvent extraction chamber and at least one second port for removing content from the solvent extraction chamber, a dispersed phase inlet in fluid communication with the first end of the solvent extraction chamber and a membrane having pores. Diameters of the pores are from 1 to 100 µm and do not differ by more than 20%, and center-to-center distances between the pores are from 10 to 1000 µm and do not differ more than 20%. The membrane is positioned at the first end of the solvent extraction chamber relative to the dispersed
(Continued)

phase inlet such that a liquid provided into the solvent extraction chamber through the dispersed phase inlet must pass through the membrane.

20 Claims, 3 Drawing Sheets

(52) U.S. Cl.
CPC ..... *B01D 17/047* (2013.01); *C10M 175/0008* (2013.01); *C10M 175/005* (2013.01)

(56) References Cited

U.S. PATENT DOCUMENTS

| | | | |
|---|---|---|---|
| 2,049,014 | A | 7/1936 | Mcafee et al. |
| 2,248,131 | A | 7/1941 | Smith |
| 2,435,707 | A | 2/1948 | Bray et al. |
| 3,265,212 | A | 8/1966 | Bonsall |
| 3,304,255 | A | 2/1967 | Katsuta et al. |
| 3,930,988 | A | 1/1976 | Johnson |
| 4,028,226 | A | 6/1977 | Forsberg |
| 4,256,578 | A | 3/1981 | Kozar |
| 4,741,840 | A | 5/1988 | Atherton et al. |
| 5,137,654 | A | 8/1992 | Burke |
| 5,976,357 | A | 11/1999 | Strom et al. |
| 8,816,105 | B2 | 8/2014 | Ristolainen et al. |
| 10,493,383 | B2 | 12/2019 | Teodorescu |
| 10,995,279 | B2 | 5/2021 | Sundström et al. |
| 11,130,075 | B2 | 9/2021 | Sundström et al. |
| 11,958,004 | B2 | 4/2024 | Persson et al. |
| 12,097,453 | B2 | 9/2024 | Sundström et al. |
| 2003/0000895 | A1 | 1/2003 | Hensley et al. |
| 2006/0000787 | A1 | 1/2006 | Galasso et al. |
| 2006/0135377 | A1 | 6/2006 | Li et al. |
| 2006/0283807 | A1 | 12/2006 | Owen |
| 2007/0241030 | A1 | 10/2007 | Strom |
| 2008/0314821 | A1 | 12/2008 | Ohashi et al. |
| 2009/0078632 | A1 | 3/2009 | Gallo et al. |
| 2011/0174695 | A1 | 7/2011 | Goldman |
| 2011/0213169 | A1 | 9/2011 | Ristolainen et al. |
| 2013/0026082 | A1 | 1/2013 | Al-Shafei et al. |
| 2013/0098805 | A1 | 4/2013 | Bjornson et al. |
| 2014/0224640 | A1 | 8/2014 | Fincher et al. |
| 2014/0332473 | A1 | 11/2014 | Haberman et al. |
| 2015/0072850 | A1 | 3/2015 | Derrick et al. |
| 2015/0152340 | A1 | 6/2015 | Cherney et al. |
| 2015/0224431 | A1 | 8/2015 | Wase |
| 2015/0265955 | A1 | 9/2015 | Kanchi et al. |
| 2015/0283487 | A1 | 10/2015 | Demmel et al. |
| 2015/0322348 | A1 | 11/2015 | Dasgupta |
| 2016/0052799 | A1 | 2/2016 | Grave et al. |
| 2016/0122209 | A1 | 5/2016 | Newman, Jr. |
| 2016/0177198 | A1 | 6/2016 | Mao |
| 2016/0207791 | A1 | 7/2016 | Rabe et al. |
| 2016/0264442 | A1 | 9/2016 | Knoop |
| 2017/0029716 | A1 | 2/2017 | Dasgupta |
| 2017/0190985 | A1 | 7/2017 | Matza |
| 2019/0192996 | A1 | 6/2019 | Persson |
| 2020/0056102 | A1 | 2/2020 | Sundström et al. |
| 2020/0230520 | A1 | 7/2020 | Sundström et al. |
| 2021/0101094 | A1 | 4/2021 | Sundström et al. |
| 2022/0096976 | A1 | 3/2022 | Mineo et al. |
| 2023/0182050 | A1 | 6/2023 | Oestberg et al. |
| 2024/0252963 | A1 | 8/2024 | Persson et al. |

FOREIGN PATENT DOCUMENTS

| | | |
|---|---|---|
| CN | 102925275 A | 2/2013 |
| CN | 103111089 A | 5/2013 |
| CN | 105457606 A | 4/2016 |
| CN | 205133522 U | 4/2016 |
| CN | 107158744 A | 9/2017 |
| DE | 19522596 A1 | 1/1997 |
| DE | 102009006586 A1 | 6/2010 |
| EP | 0693544 A2 | 1/1996 |
| EP | 1561797 A1 | 8/2005 |
| EP | 2181744 A1 | 5/2010 |
| ES | 2374247 A1 | 2/2012 |
| GB | 500433 A | 2/1939 |
| GB | 547020 A | 8/1942 |
| GB | 758747 A | 10/1956 |
| GB | 1294861 A | 11/1972 |
| GB | 1450673 A | 9/1976 |
| GB | 2107347 A | 4/1983 |
| GB | 2334034 | 8/1999 |
| JP | S60135483 A | 7/1985 |
| JP | S6351903 U | 4/1988 |
| JP | 2001239111 A | 9/2001 |
| JP | 2016161464 A | 9/2016 |
| WO | 2005111181 A1 | 11/2005 |
| WO | 2017196234 A1 | 11/2017 |
| WO | 2018199837 A1 | 11/2018 |
| WO | 2018199838 A1 | 11/2018 |
| WO | 2018199839 A1 | 11/2018 |
| WO | 2020162815 A1 | 8/2020 |
| WO | 2020162816 A1 | 8/2020 |
| WO | 2021041210 A1 | 3/2021 |

OTHER PUBLICATIONS

Communication from the European Patent Office dated Oct. 30, 2024 in related EP application No. 21 725 515.7, including examined claims 1-17.

Mahadi Hasan et al, "A review of modern advancements in micro drilling techniques", Journal of Manufacturing Processes, vol. 29, 2017, pp. 343-375, Elsevier, Amsterdam, Netherlands.

International Search Report and Written Opinion dispatched Nov. 25, 2021 for parent application No. PCT/EP2021/062674.

Office Action from the Chinese Patent Office dispatched Apr. 26, 2025, in counterpart CN application No. 202180036887.8, and translation thereof.

SOLVENT EXTRACTION SYSTEM AND METHOD

CROSS-REFERENCE

This application is the U.S. National Stage of International Application No. PCT/EP2021/062674 filed on May 12, 2021, which claims priority to German patent application no. 10 2020 206 227.7 filed on May 18, 2020.

TECHNICAL FIELD OF THE INVENTION

The present invention relates to a solvent extraction system and to a method for performing solvent extraction. It is furthermore related to an oil purification system comprising such a solvent extraction system.

BACKGROUND

Solvent extraction is often performed in batches in which the phases of a two phase system are brought in good contact with each other through mixing, thereby creating a dispersed phase and a continuous phase, whereafter the phases are allowed to separate through sedimentation of the heavy phase due to gravitational force. Another way of performing solvent extraction is using a continuous column in which a continuous flow of dispersed phase is brought into contact with a continuous flow of continuous phase in a countercurrent or crosscurrent fashion. The flow of heavy phase down through the column is due to gravitational force while the flow of light phase is achieved by pumping.

Contaminated oil can be cleaned by solvent extraction by using a separation aid, where the separation aid is the dispersed phase. This has been described in, for example, WO 2018/199839.

SUMMARY

It is therefore one non-limiting object of the present teachings to disclose techniques for improving a solvent extraction system and method.

It is another non-limiting object of the present teachings to disclose techniques for improving a system and a method which are suitable for cleaning of (contaminated) oil.

According to one aspect of the present teachings, a solvent extraction system may comprise:
an elongated solvent extraction chamber having a first end and an opposite second end and a length, $L$, between said first and second ends, wherein said solvent extraction chamber comprises at least one port for providing a continuous phase into the solvent extraction chamber and for removing content out from the solvent extraction chamber;
a membrane comprising pores having substantially the same diameter, not differing more than 20%, and center-to-center distances between said pores being substantially the same, not differing more than 20%, wherein said membrane is positioned in connection with the solvent extraction chamber at its first end; and
a dispersed phase inlet which is positioned to be in fluid connection with the first end of the solvent extraction chamber and such that a liquid provided into the solvent extraction chamber through the dispersed phase inlet has to pass through the membrane.

According to another aspect of the present teachings, a method for solvent extraction in a solvent extraction system according to the present teachings may comprise:
providing a first liquid into the solvent extraction chamber through one of the at least one port;
providing a second liquid into the solvent extraction chamber from the dispersed phase inlet and via the membrane;
collecting dispersed phase from one of the at least one port; and
collecting continuous phase from one of the at least one port.

According to still another aspect of the present teachings, an oil purification system comprising a solvent extraction system according to the present teachings may be configured to be connected to a technical equipment which is using oil, such that the oil is continuously circulated through the solvent extraction system, as the continuous phase for cleaning of the oil.

A solvent extraction system is thus provided in which a dispersed phase will have uniformly sized droplets whereby solvent extraction will be more effective. A liquid that will serve as the dispersed phase is provided into the solvent extraction chamber through a membrane which will emulsify said liquid into the dispersed phase. The membrane comprises pores which are approximately equal in size and which are distributed evenly over the membrane which will ensure a good emulsification. As a result, the dispersed phase will comprise droplets that are approximately equal in size, whereby a more efficient solvent extraction can be performed than with conventional mixing and dispersing systems. Furthermore, a continuous solvent extraction can effectively be performed with such a solvent extraction system.

In some embodiments of the present teachings, the solvent extraction system further comprises a mixer disposed inside the solvent extraction chamber, wherein said mixer comprises a mixing blade which is positioned closer to the first end of the solvent extraction chamber than ⅛ of the total length, $L$, of the solvent extraction chamber. The mixing blade preferably closely disposed next to, but not directly contacting, an outlet (output) side of the membrane, wherein the dispersed phase will be provided into the solvent extraction chamber from said outlet side of the membrane. Such a membrane and positioning thereof enables the size of the droplets of the dispersed phase to be further controlled. By controlling (adjusting) the rotation speed of the mixing blade, the size of the droplets when leaving the membrane can also be controlled.

In some embodiments of the present teachings, the pores of the membrane can have a pore diameter between 1-100 µm and the distance between the pores, center-to-center, can be between 10-1000 µm. The membrane can be configured such that a liquid passing through said membrane will be emulsified.

In some embodiments of the present teachings, the solvent extraction chamber is vertically oriented and gravity is used for separating phases.

In some embodiments of the present teachings, the solvent extraction chamber comprises at least two ports comprising a first port for removing content out from the solvent extraction chamber and a second port for providing a continuous phase into the solvent extraction chamber.

In some embodiments of the present teachings, the solvent extraction chamber comprises at least three ports comprising a first port for removing dispersed phase out from the solvent extraction chamber, a second port for providing a continuous phase into the solvent extraction chamber and a third port for removing a continuous phase out from the solvent extraction chamber, wherein the first port and the second port are provided at a distance from the second end of the solvent extraction chamber which is smaller than ⅕ of the total length, L, of the elongated solvent extraction chamber and wherein the third port is provided at a distance from the first end of the solvent extraction chamber which is smaller than ⅕ of the total length, L, of the elongated solvent extraction chamber.

In some embodiments of the present teachings, the distance between the second end of the solvent extraction chamber and the first port is smaller than the distance between the second end of the solvent extraction chamber and the second port.

In some embodiments of the present teachings, the third port comprises a filter that prevents (inhibits, blocks) the dispersed phase from being transferred out from the solvent extraction system through the third port.

In some embodiments of the present teachings, the solvent extraction system further comprises at least first and second pumps, wherein the first pump is connected to the second port and to a first liquid source and is configured to pump a first liquid from the first liquid source into the solvent extraction chamber, which first liquid will serve as the continuous phase in the solvent extraction chamber, and wherein the second pump is connected to the dispersed phase inlet and to a second liquid source and is configured to pump a second liquid from the second liquid source into the solvent extraction chamber, which second liquid will serve as the dispersed phase in the solvent extraction chamber.

In some embodiments of the present teachings, the system is configured to be run continuously, wherein the first and second pumps are configured to pump continuously.

In some embodiments of the present teachings, the solvent extraction system is configured for cleaning contaminated oil, wherein the solvent extraction system comprises a (the) first liquid source containing contaminated oil to be cleaned, which first liquid source is connected to the second port and wherein the solvent extraction system further comprises a (the) second liquid source containing a liquid separation aid, which second liquid source is connected to the dispersed phase inlet, wherein the separation aid will attract contaminants in the contaminated oil during a solvent extraction process performed in the solvent extraction chamber.

In some embodiments of the present teachings, the separation aid is a liquid at the temperature at which the process is carried out and will by chemical interactions adsorb/absorb contaminating solids or dissolved impurities in the oil to be purified and wherein the separation aid composition is at least substantially insoluble in the oil to be purified because of its polar properties, thereby forming a two-phase mixture upon mixing with the oil to be purified and wherein the separation aid has a density different from that of the oil to be purified.

In some embodiments of the present teachings, the solvent extraction system comprises a membrane emulsification unit comprising the above-described membrane.

In some embodiments of the present teachings, the rate of fluid flow of a (the) first liquid provided into the solvent extraction chamber is controlled such that the flow rate through the solvent extraction chamber for the continuous phase is kept lower than a sedimentation/rising rate of a (the) dispersed phase through the solvent extraction chamber.

DETAILED DESCRIPTION OF EMBODIMENTS

Figure 1:
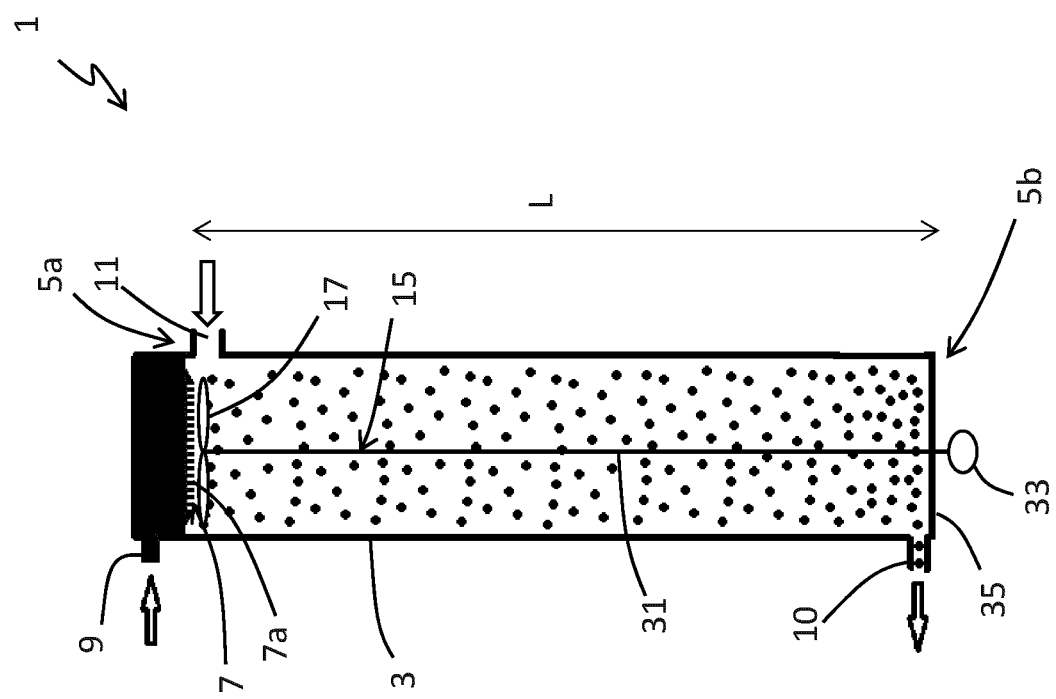
FIG. 1 shows schematically a solvent extraction system according to one embodiment of the present teachings.

Methods and systems according to the present teachings may be used for solvent extraction, which is also known as liquid-liquid extraction. Two liquids which are not soluble in each other, i.e. having different polarities are used, and an interchange of components between the liquids is facilitated by the solvent extraction system according to the present teachings. The two liquids also have different densities whereby the two liquids after mixing will separate.

The terms continuous phase and dispersed phase which are commonly used in the technical area of solvent extraction (also called liquid-liquid extraction) are also used throughout this description. A first liquid is called the continuous phase and will be the phase which during the solvent extraction is continuous, i.e. not in droplets, and a second liquid is called the dispersed phase and will be the phase which during solvent extraction is dispersed, i.e. dispersed into droplets which are surrounded by the continuous phase. During solvent extraction some components will pass between these two phases, whereby the dispersed phase taken out from the solvent extraction system after solvent extraction will not contain exactly the same components as the second liquid, also called the dispersed phase, when entering the solvent extraction system and the continuous phase taken out after solvent extraction is accordingly not exactly the same as the first liquid, also called the continuous phase, when provided into the solvent extraction system.

By providing the liquid which will become the dispersed phase into the solvent extraction chamber of the solvent extraction system through a membrane, the size of the droplets can be controlled and also can be made to be very uniform. A membrane can be provided having pores of a suitable size and interspacing. In this case, the dispersed phase can be emulsified after entering into the solvent extraction chamber.

A pump that forces the liquid through the membrane and a membrane which is designed for emulsification can be provided according to the present teachings. Furthermore, a mixing blade of a mixer can in some embodiments be provided in the solvent extraction chamber close to an outlet (output, downstream) side of the membrane. In this case, the loosening of the droplets from the outlet side of the membrane can be controlled by controlling the rotation speed of the mixer, whereby the droplet sizes also can be further controlled. According to the present teachings, a method for solvent extraction is provided comprising emulsification of the dispersed phase after entering into the solvent extraction chamber. Hereby solvent extraction can be improved.

Embodiments according to the present teachings will now be described with reference to the drawings. Many of the details are the same in the different described embodiments and are given the same reference numbers. Solvent extraction according to the present teachings can be performed either in batches or in a continuous flow.

Figure 2:
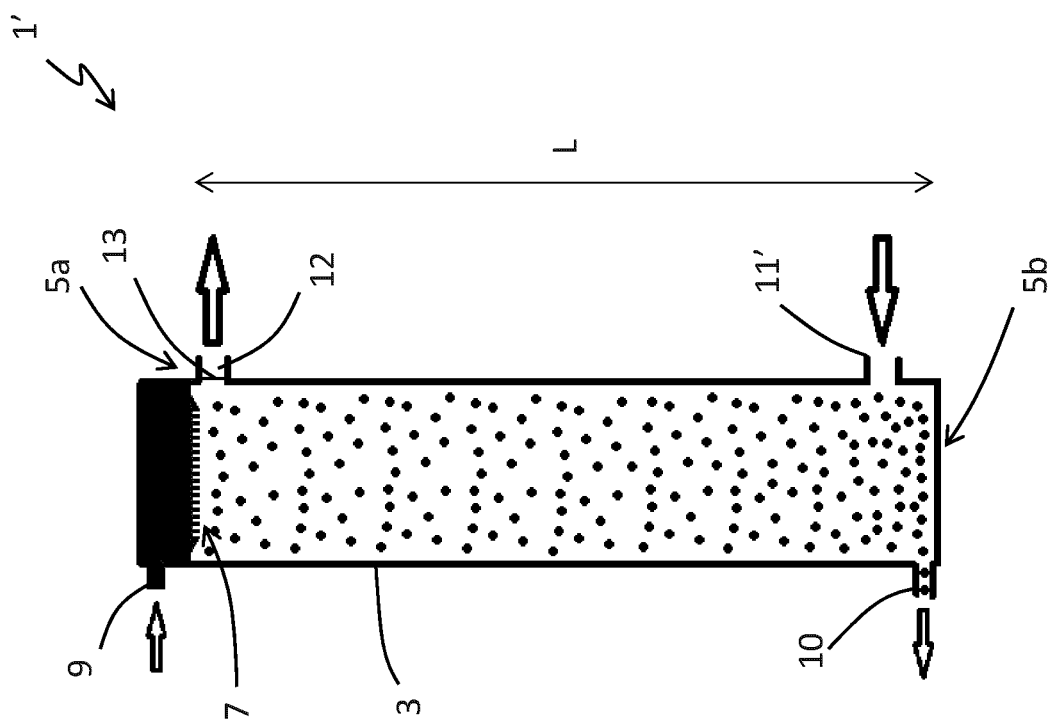
FIG. 2 shows schematically a solvent extraction system according to another embodiment of the present teachings.
Figure 3:
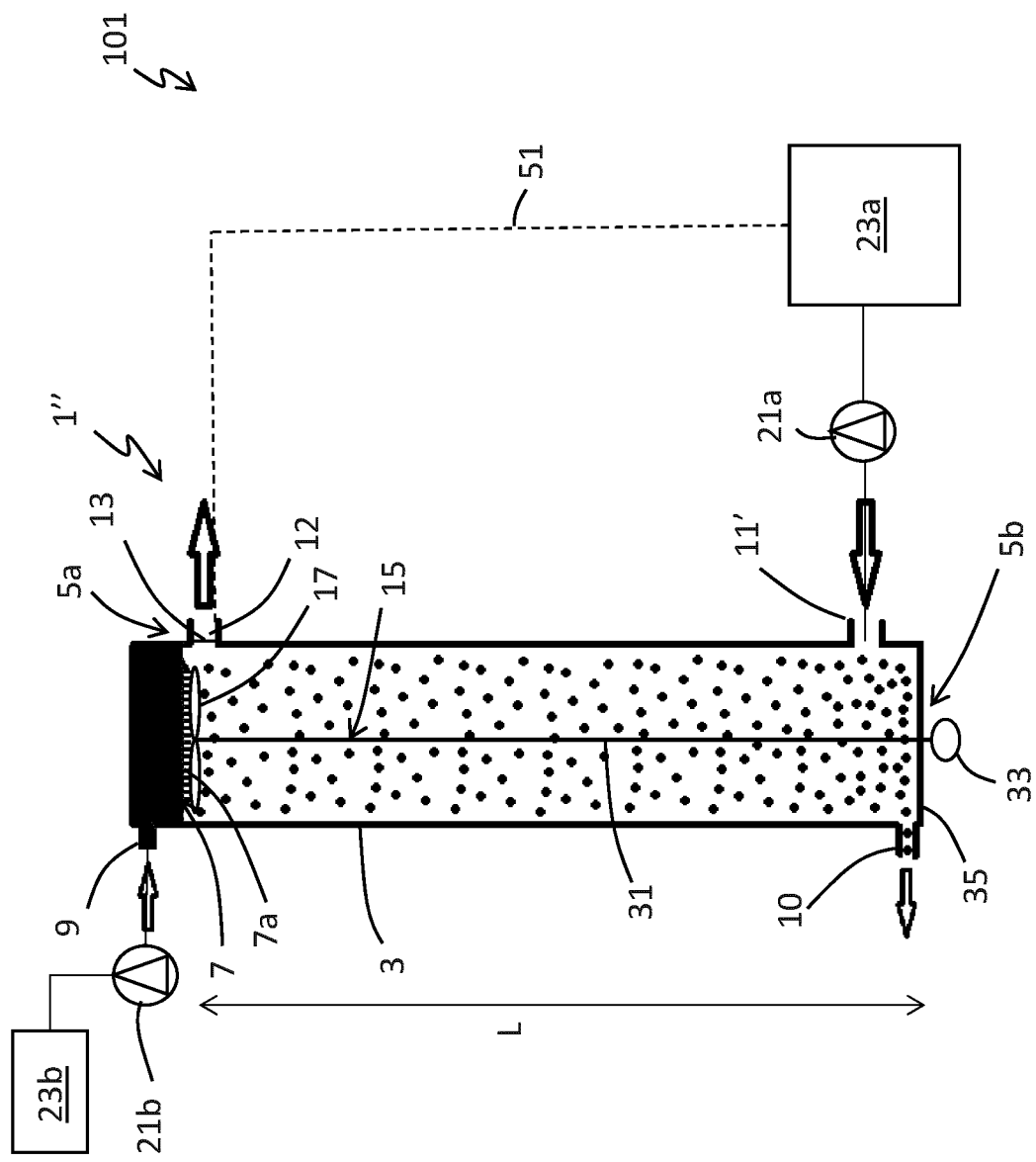
FIG. 3 shows schematically a solvent extraction system according to another embodiment of the present teachings.

A solvent extraction system 1 suitable for a batch process is schematically shown in FIG. 1 and two slightly different solvent extraction systems 1', 1" suitable for a continuous process are schematically shown in FIGS. 2 and 3, respectively. Some details which are common to these three different embodiments of the present teachings will first be described with reference to all of FIGS. 1-3.

A solvent extraction system 1; 1'; 1" is provided comprising an elongated solvent extraction chamber 3 having a first end 5a and an opposite second end 5b and a length, L, between said first and second ends 5a, 5b. The solvent extraction chamber 3, which may also be simply called chamber 3 herein, comprises at least one port 10, 11; 11', 12 for providing a continuous phase into the solvent extraction chamber 3 and for removing content out from the solvent extraction chamber. The at least one port 10, 11; 11', 12 comprises at least one of a first port 10, a second port 11; 11' and a third port 12. In the embodiment as shown in FIG. 1, the solvent extraction chamber 3 comprises a first port 10 and a second port 11 and in the embodiments as shown in FIGS. 2 and 3 the solvent extraction chamber 3 comprises a first port 10, a second port 11' and a third port 12.

According to the present teachings, the solvent extraction system 1; 1'; 1" further comprises a membrane 7 having pores which are well defined and substantially equal in diameter and interspacing. The membrane 7 is positioned at the first end 5a of the solvent extraction chamber 3. The membrane 7 is configured such that a liquid passing through said membrane 7 will be emulsified. The pores of the membrane can have substantially the same diameter, not differing more than 20%, and center-to-center distances between said pores can be substantially the same, not differing more than 20%. The pores of the membrane 7 can for example have a pore diameter between 1-100 μm and the distance between the pores, center-to-center (also called pitch), can for example be between 10-1000 μm. In some embodiments the pores of the membrane 7 can have a pore diameter between 2-10 μm and the distance between the pores, center-to-center, can be between 30-300 μm. In one embodiment of the present teachings, a membrane emulsification unit comprising the membrane 7 is provided at the first end 5a of the solvent extraction chamber 3. The membrane 7 can in some embodiments be hydrophobic or hydrophilic, as will be further explained below.

The solvent extraction system 1; 1'; 1" further comprises a dispersed phase inlet 9 which is positioned to be in fluid connection with the first end 5a of the solvent extraction chamber 3 and such that a liquid provided into the solvent extraction chamber 3 through the dispersed phase inlet 9 has to pass through the membrane 7. Hereby a liquid which is provided through the dispersed phase inlet 9 into the solvent extraction chamber 3 will be emulsified into a dispersed phase when passing through the membrane 7. Thanks to the pores of the membrane 7 being equal in diameter and interspacing, the dispersed phase will comprise equally sized droplets which will improve the solvent extraction performed in the solvent extraction system 1, 1', 1".

The solvent extraction chamber 3 is vertically oriented and gravity is used for separating phases. The dispersed phase may either have a larger density than the continuous phase and sink to the bottom of the solvent extraction chamber (the second end 5b) or have a smaller density than the continuous phase and rise to the top of the solvent extraction chamber. In that case, the solvent extraction systems 1, 1', 1" as shown in FIGS. 1-3 may simply be flipped upside down; i.e. the top of the solvent extraction chamber is in this case the second end 5b and the bottom is the first end 5a.

In some embodiments of the present teachings, the solvent extraction system 1; 1" further comprises a mixer 15 provided inside the solvent extraction chamber 3. The mixer 15 comprises a mixing blade 17 which is positioned closer to the first end 5a of the solvent extraction chamber 3 than ⅛ of the total length, L, of the solvent extraction chamber 3. The mixing blade 17 is positioned in close relation but not directly contacting an outlet side 7a of the membrane 7, wherein the dispersed phase will be provided into the solvent extraction chamber 3 from the outlet side 7a of the membrane 7. Rotation of the mixing blade 17 of the mixer 15 can improve the efficiency of the emulsification of the dispersed phase when passing through the membrane 7. Loosening of the droplets from the pores of the membrane also can be controlled by controlling the rotation speed of the mixing blade 17. The sizes of the droplets can be controlled by controlling the rotation speed of the mixing blade 17. Furthermore, the mixer 15 will improve the mixing of the dispersed phase with the continuous phase inside the solvent extraction chamber 3. In the embodiments as shown in FIGS. 1 and 3, the mixer 15 comprises a shaft 31 protruding through the solvent extraction chamber 3 in a centre of the solvent extraction chamber and along its length, L. A motor 33 can then be provided outside the solvent extraction chamber 3 at its second end 5b connected to the shaft 31 through a mechanical seal in an end unit 35 of the solvent extraction chamber 3. However, in another embodiment the mixing blade 17 of the mixer 15 could be connected to a motor in another way, for example the mixer could be magnetically driven. The rotation of the shaft 31 in the embodiments as shown in FIGS. 1 and 3 may however contribute to a further mixing of the dispersed phase and the continuous phase throughout the solvent extraction chamber 3 which may be positive for the solvent extraction.

In the embodiment as shown in FIG. 1, the solvent extraction chamber 3 comprises a first port 10 for removing content out from the solvent extraction chamber 3 and a second port 11 for providing a continuous phase into the solvent extraction chamber 3. This arrangement can be used for a batch process. A continuous phase is provided into the solvent extraction chamber 3 through the second port 11 and a dispersed phase is provided through the dispersed phase inlet 9 and through the membrane 7. The dispersed and continuous phase are mixed and solvent extraction can occur. The dispersed phase will move through the chamber 3 to the second end 5b of the chamber thanks to gravitation. Depending on the orientation of the solvent extraction chamber (which will depend on density difference of the dispersed and continuous phase), the dispersed phase will either sink to the bottom or rise to the top of the solvent extraction chamber 3. However, the dispersed phase will always separate to the second end 5b of the solvent extraction chamber 3, which is the top or the bottom of the chamber depending on the orientation of the chamber.

After the dispersed phase has separated near the second end 5b of the chamber 3, the dispersed phase can be removed from the chamber 3 through the first port 10. The first port 10 can be provided in the second end 5b of the chamber 3 or close to the second end 5b of the chamber 3. Close to the second end 5b can for example be that the first port 10 is provided at a distance from the second end 5b of the solvent extraction chamber 3 which is smaller than ⅕ of the total length, L, of the elongated solvent extraction chamber or smaller than ⅛ of the total length, L, of the solvent extraction chamber 3.

After the dispersed phase has been removed, the continuous phase can be removed through the first port 10. In another embodiment a third port 12 can be provided for removing the continuous phase. A third port 12 can in this embodiment be provided close to the second end 5b but at a larger distance from the second end 5b than the first port 10, for example at a distance which is smaller than ⅕ of the total length, L, of the solvent extraction chamber 3 or smaller than ⅛ of the total length, L, of the chamber 3. In this embodiment the second port 11 can be provided close to the first end 5a of the chamber 3, which could be for example at a distance from the first end 5a of the solvent extraction chamber 3 which is smaller than ⅕ of the total length, L, of the elongated solvent extraction chamber 3.

In the embodiments as shown in FIGS. 2 and 3, the solvent extraction chamber 3 comprises three ports 10, 11', 12, namely: a first port 10 for removing dispersed phase out from the solvent extraction chamber 3, a second port 11' for providing a continuous phase into the solvent extraction chamber 3 and a third port 12 for removing a continuous phase out from the solvent extraction chamber 3. The first port 10 and the second port 11' are provided at a distance from the second end 5b of the solvent extraction chamber 3 which is smaller than ⅕ of the total length, L, of the elongated solvent extraction chamber 3 and the third port 12 is provided at a distance from the first end 5a of the solvent extraction chamber 3 which is smaller than ⅕ of the total length, L, of the elongated solvent extraction chamber 3. These embodiments are suitable for a continuous process in which a continuous phase is continuously pumped into the chamber 3 through the second port 11' and a separation aid that will become the dispersed phase is continuously pumped into the chamber 3 through the dispersed phase inlet 9.

A solvent extraction system 1" comprising pumps and liquid sources is shown in FIG. 3. This solvent extraction system 1" comprises at least first and second pumps 21a, 21b; namely, a first pump 21a is connected to the second port 11' and to a first liquid source 23a and is configured for pumping a first liquid from the first liquid source into the solvent extraction chamber 3, which first liquid will be a continuous phase in the solvent extraction chamber 3 and a second pump 21b is connected to the dispersed phase inlet 9 and to a second liquid source 23b and is configured for pumping a second liquid from the second liquid source 23b into the solvent extraction chamber 3, which second liquid will be a dispersed phase in the solvent extraction chamber 3. This system is suitably run continuously, wherein the first and second pumps 21a, 21b are configured to pump continuously. Preferably, the rate of fluid flow of the first liquid pumped into the solvent extraction chamber 3 by the first pump 21a is controlled such that a flow rate through the chamber 3 for the continuous phase is kept lower than a sedimentation/rising rate of a dispersed phase through the solvent extraction chamber 3. In this case, solvent extraction and separation of dispersed phase through the chamber 3 can be effectively performed in a continuous process.

A continuous phase will be continuously collected through the third port 13 which may comprise a filter 13 that prevents (inhibits, blocks) dispersed phase from being transferred out from the solvent extraction system 3 through the third port 12. If the dispersed phase is hydrophilic, then the filter 13 can for example be a hydrophobic filter that inhibits the dispersed phase from interacting with the filter 13. On the other hand, if the dispersed phase is instead hydrophobic, then the filter 13 can instead be hydrophilic.

As shown in both FIGS. 2 and 3, the distance between the second end 5b of the solvent extraction chamber 3 and the first port 10 can be smaller than the distance between the second end 5b of the solvent extraction chamber 3 and the second port 11'. In this case, it can be avoided that the continuous phase provided into the chamber 3 is directly transferred to the first port 10. The second port 11' can also in some embodiments be directed slightly towards the first end 5a of the chamber 3 such that the flow of continuous phase provided into the chamber 3 is directed towards the first end 5a.

In some embodiments of the present teachings, the solvent extraction system 1; 1'; 1" according to the present teachings is configured for cleaning contaminated oil, such as for example industrial oil, lubrication oil, motor oil, hydraulic oil or processing oil for example used in gear box, hydraulic systems, engines, automotive equipment, construction equipment.

In such embodiments a separation aid for cleaning of the oil is provided as the dispersed phase through the dispersed phase inlet 9 and through the membrane 7 such that it is emulsified when entered into the solvent extraction chamber 3. Contaminated oil is provided through the second port 11, 11' of the chamber 3. The separation aid will attract contaminants in the contaminated oil, whereby separation aid with attracted contaminations will be removed through the first port 10 of the chamber 3.

In the embodiment as shown in FIG. 3, a first liquid source 23a which is connected to the second port 11' contains contaminated oil to be cleaned and a second liquid source 23b which is connected to the dispersed phase inlet 9 contains a liquid separation aid, wherein the separation aid will attract contaminants in the contaminated oil during a solvent extraction process performed in the solvent extraction chamber 3.

In such embodiments, the membrane 7 is adapted for this specific separation aid, i.e. such that a suitable droplet size of the separation aid is provided when the separation aid is passing through the membrane 7. The separation aid may have a viscosity between 30-400 cSt and the oil may have a viscosity between 1-400 cSt. In that case a suitable droplet size of the separation aid for achieving a good solvent extraction effect may be between 10-30 μm. To achieve this droplet size, the pores of the membrane 7 can in some embodiments of the present teachings have a pore diameter between 2-10 μm and the distance between the pores, center-to-center, can be between 30-300 μm. In some embodiments of the present teachings, the pores of the membrane 7 can have a pore diameter between 2-5 μm and the distance between the pores, center-to-center, can be between 30-60 μm. In such embodiments, a droplet size of the separation aid is provided which is suitable for solvent extraction and for cleaning of contaminated oil.

The solvent extraction and separation of dispersed phase through the chamber 3 can as described above be effectively performed in a continuous process. Hereby the solvent extraction system 1" according to the present teachings can be connected directly to a technical equipment, which is using oil, for continuous cleaning of the oil. Various types of technical equipment that use oil include, for example, an industrial equipment, an automotive equipment, a construction equipment or metalworking machines using industrial oil, hydraulic oil, motor oil and/or lubrication oil, such as for example gear boxes, engines, hydraulic systems etc.

Thus, an oil purification system 101 comprising a solvent extraction system according to the present teachings is also provided according to the present teachings. This is schematically shown in FIG. 3 by a dotted line 51 from the third port 12 to the first liquid source 23a. In this embodiment the first liquid source 23a is the technical equipment, also denoted 23a, which in this example is directly connected to the solvent extraction system 1" according to the present teachings for continuously cleaning of the oil which is used in the technical equipment. The second port 11' of the solvent extraction chamber 3 is in this embodiment configured for being connected to the technical equipment 23a via the pump 21a for receiving contaminated oil to be cleaned and the third port 12 of the solvent extraction chamber 3 is configured for being connected to the technical equipment 23a for transferring cleaned oil from the solvent extraction system to the technical equipment.

The separation aid is a liquid at the temperature at which the process is carried out and will by chemical interactions adsorb/absorb contaminating solids or dissolved impurities in the oil to be purified and wherein the separation aid composition is at least substantially insoluble in the oil to be purified because of its polar properties, thereby forming a two-phase mixture upon mixing with the oil to be purified and wherein the separation aid has a density different from that of the oil to be purified.

The use of a separation aid, also called a chemical booster, for capturing contaminants/impurities in contaminated oil has been described before. A liquid separation aid is added to the oil and mixed therewith and impurities in the oil will be captured by the separation aid. The separation aid is at least substantially insoluble in the oil, thereby forming a two phase mixture upon mixing and the separation aid attracts impurities in the oil during mixing of oil and separation aid. The separation aid will by chemical interactions adsorb/absorb contaminating solids, or dissolved impurities in the contaminated target oil. The separation aid should be a liquid at the temperature at which the process is carried out. The separation aid composition should be at least substantially insoluble in the contaminated target oil, thereby forming a two-phase mixture upon mixing with the contaminated oil. The liquid separation aid can also have a density different from that of the contaminated oil to be purified.

The separation aid is not soluble in the contaminated target oil because of its polar properties and thus colloids consisting of small droplets of the liquid separation aid composition are formed by the stirring, which through chemical interactions (hydrophilic, hydrophobic, and charge interactions) may absorb unwanted solid or the dissolved impurities in the contaminated target oil. In embodiments in which the separation aid has a higher density than the oil, the separation aid will, owing to gravity separation, form a lower phase together with the solid and/or dissolved impurities. In embodiments in which the separation aid has a lower density than the contaminated target oil, it will form an upper phase owing to gravity separation.

The liquid separation aid for use in the present teachings can be made up based on the following components: a) a polar polymer; b) a hydrotrope/solubilizer; and, c) a co-tenside.

Suitable separation aids with the properties described above that can be used in the processes according to the present teachings, may e.g. constitute a composition comprising a mixture of polar polymers such as polyethylene glycols, polypropylene glycols or similar polyalkylene glycols, organic surface active components with nonionic, anionic, cationic and amphoteric properties with the ability to enhance the solubility of solid or dissolved impurities into the separation aid.

One example of a separation aid which can be used with the present teachings comprises: a) at least one polar polymer that is not soluble in oil and has a higher density than the oil, such as polyethylene glycol having an average molecular weight of 190-210 g/mole, e.g. Carbowax® PEG 200 (Dow Chemical Company); b) at least one surface active hydrotrope/solubilizer, such as anionic sulfonic acids, phosphate ester-based substances or non-ionic surfactants from the poly-glycoside family, such as Simulsol SL 4, Simulsol SL 7 G and Simulsol AS 48 (Seppic, Air Liquide group); and c) at least one amphoteric co-surfactant, such as a propionate type, e.g., Ampholak YJH-40 (Akzo Nobel) which is a sodium caprylimino dipropionate.

The separation aid may also have a sufficiently big difference in polarity compared to the polarity of at least one specific additive in the oil to be purified such that the at least one specific additive is not soluble in the separation aid. Hereby valuable additives in the oil can be kept in the oil during the solvent extraction, i.e. during the cleaning of the oil. Thanks to the different polarities, the additives, or at least some of the additives, will not be attracted by the separation aid and will stay in the oil. The oil can furthermore from the start be provided with suitable additives having suitable polarities in relation to the used separation aid. In this case, it can be assured that additives are not removed during cleaning of the oil.

A number of solvent extraction systems 1, 1', 1" according to the present teachings can be connected in series in order to improve solvent extraction efficiency or in the example of cleaning of contaminated oil in order to improve cleaning efficiency.

A method for solvent extraction in a solvent extraction system according to the present teachings is also provided according to the present teachings. The steps of the method are described without any specific order below. The method can as described above be a continuous process whereby the order of the method steps will be of no importance and are actually performed simultaneously.

Providing a first liquid into the solvent extraction chamber 3 through one of the at least one port 10, 11, 11', 12. The rate of fluid flow of the first liquid provided into the solvent extraction chamber 3 can suitably as described above be controlled such that the flow rate through the chamber 3 for the continuous phase is kept lower than a sedimentation/rising rate of a dispersed phase through the solvent extraction chamber 3. In an example in which the solvent extraction system according to the present teachings is used for cleaning a contaminated oil, the first liquid is the contaminated oil.

Providing a second liquid into the solvent extraction chamber 3 from the dispersed phase inlet 9 and via the membrane 7. In an example in which the solvent extraction system according to the present teachings is used for cleaning a contaminated oil, the second liquid is the separation aid.

Collecting dispersed phase from one of the at least one port 10, 11, 11', 12. In an example in which the solvent extraction system according to the present teachings is used for cleaning a contaminated oil, the collected dispersed phase contains separation aid with attracted contaminants. The contaminants have been moved from the oil to the separation aid by solvent extraction.

Collecting continuous phase from one of the at least one port 10, 11, 11', 12. In an example in which the solvent extraction system according to the present teachings is used for cleaning a contaminated oil, the collected continuous phase contains cleaned oil.

The invention claimed is:
1. A solvent extraction system for purifying contaminated oil, comprising:
an elongated solvent extraction chamber having a first end, a second end, a length (L) between the first end and the second end, at least one first port and at least one second port;

a first liquid source containing contaminated oil to be cleaned;

a first pump in fluid communication between the first liquid source and the at least one second port, the first pump being configured to pump the contaminated oil from the first liquid source into the solvent extraction chamber via the at least one second port;

a second liquid source containing a liquid separation aid, the liquid separation aid being a polar solution and at least substantially insoluble in the contaminated oil such that the liquid separation aid and the contaminated oil form two phases upon mixing, the liquid separation aid having a different density than the contaminated oil, and having the property of adsorbing and/or absorbing contaminating solids and/or dissolved impurities in the contaminated oil;

a dispersed phase inlet in fluid communication with a space in the solvent extraction chamber adjacent the first end of the solvent extraction chamber;

a second pump in fluid communication between the second liquid source and the dispersed phase inlet, the second pump being configured to pump the liquid separation aid from the second liquid source into the solvent extraction chamber via the dispersed phase inlet; and a membrane having pores, diameters of the pores being from 1 to 100 μm and not differing by more than 20%, and center-to-center distances between the pores being from 10 to 1000 μm and not differing more than 20%, wherein the membrane is positioned in the space in the solvent extraction chamber adjacent the first end of the solvent extraction chamber relative to the dispersed phase inlet such that the liquid separation aid provided into the solvent extraction chamber through the dispersed phase inlet must pass through the membrane before mixing with the contaminated oil;

wherein the at least one first port is configured to remove the liquid separation aid with adsorbed/absorbed contaminating solids and/or dissolved impurities after having been mixed with the contaminated oil.

2. The solvent extraction system according to claim 1, further comprising:
a mixer inside the solvent extraction chamber,
wherein the mixer comprises a mixing blade located at a first distance from the first end of the solvent extraction chamber that is less than ⅛ of the length (L) of the solvent extraction chamber, said mixing blade not directly contacting the membrane.

3. The solvent extraction system according to claim 2, further comprising:
a third port in fluid communication with the solvent extraction chamber, the third port being configured to remove a continuous phase containing purified oil from the solvent extraction chamber,
wherein:
the at least one second port and the at least one first port are provided within a first distance from the second end of the solvent extraction chamber;
the first distance from the second end of the solvent extraction chamber is less than ⅕ of the length (L) of the elongated solvent extraction chamber;
the third port is provided within a second distance from the first end of the solvent extraction chamber; and
the second distance from the first end of the solvent extraction chamber is less than ⅕ of the length (L) of the elongated solvent extraction chamber.

4. The solvent extraction system according to claim 3, wherein a distance between the second end of the solvent extraction chamber and the first port is smaller than a distance between the second end of the solvent extraction chamber and the at least one second port.

5. The solvent extraction system according to claim 3, further including:
a filter at the third port configured to inhibit dispersed phase from being transferred out of the solvent extraction system through the third port.

6. The solvent extraction system according to claim 1, wherein the first and second pumps are configured to pump continuously such that the solvent extraction system operates continuously.

7. The solvent extraction system according to claim 1, wherein the separation aid is a liquid at the temperature at which the process is carried out.

8. The solvent extraction system according to claim 1, further comprising a membrane emulsification unit that comprises the membrane.

9. An oil purification system comprising:
the solvent extraction system according to claim 3,
wherein said oil purification system is configured to be connected to a technical equipment which is using oil such that the oil is continuously circulated through the solvent extraction system as the continuous phase for purifying the oil.

10. The oil purification system according to claim 9, wherein:
the at least one second port of the solvent extraction chamber is configured to be connected to the technical equipment via the second pump; and
the third port of the solvent extraction chamber is configured to be connected to the technical equipment to transfer purified oil from the solvent extraction system back to the technical equipment.

11. A method for solvent extraction comprising:
introducing the contaminated oil into the solvent extraction chamber according to claim 1 through the at least one second port;
introducing the liquid separation aid into the solvent extraction chamber via the dispersed phase inlet and the membrane;
collecting dispersed phase from the at least one first port; and
collecting continuous phase from a third port.

12. The method according to claim 11, wherein:
introducing the contaminated oil comprises continuously proving the contaminated oil; and
introducing the liquid separation aid comprises continuously providing the liquid separation aid.

13. The method according to claim 11, wherein a rate of fluid flow of the contaminated oil provided into the solvent extraction chamber is controlled such that a flow rate through the solvent extraction chamber for the continuous phase is kept lower than a sedimentation/rising rate of a dispersed phase through the solvent extraction chamber.

14. The method according to claim 11, wherein the liquid separation aid comprises a polar polymer, a surface active hydrotrope/solubilizer, and a co-tenside.

15. The method according to claim 14, wherein:
the polar polymer comprises at least one polyalkylene glycol;
the surface active hydrotrope/solubilizer comprises an anionic sulfonic acid, a phosphate ester, and/or a polyglycoside; and the co-tenside comprises at least one amphoteric co-surfactant.

16. The solvent extraction system according to claim 1, wherein the at least one second port is located at a first position that is less than ⅕ of the length (L) of the elongated solvent extraction chamber from the second end of the solvent extraction chamber.

17. The solvent extraction system according to claim 16, further comprising:
- a rotatable mixing blade disposed in the solvent extraction chamber at a second position that is less than ⅛ of the length (L) of the solvent extraction chamber from the first end of the solvent extraction chamber;
- the membrane is disposed between the mixing blade and the dispersed phase inlet; and
- the rotatable mixing blade does not directly contact the membrane.

18. The solvent extraction system according to claim 17, further comprising:
- a third port in fluid communication with the solvent extraction chamber, the third port being configured to remove a continuous phase containing purified oil from the solvent extraction chamber; and
- a hydrophobic filter in fluid communication with the third port and inhibiting dispersed phase from being transferred out of the solvent extraction system through the third port.

19. The solvent extraction system according to claim 18, wherein the liquid separation aid comprises a polar polymer, a surface active hydrotrope/solubilizer, and a co-tenside.

20. The solvent extraction system according to claim 19, wherein:
- the polar polymer comprises at least one polyalkylene glycol;
- the surface active hydrotrope/solubilizer comprises an anionic sulfonic acid, a phosphate ester, and/or a polyglycoside; and
- the co-tenside comprises at least one amphoteric co-surfactant.

* * * * *